(12) United States Patent
White, III

(10) Patent No.: US 11,873,721 B2
(45) Date of Patent: Jan. 16, 2024

(54) DOUBLE BRUSH SEAL ASSEMBLY

(71) Applicant: RAYTHEON TECHNOLOGIES CORPORATION, Farmington, CT (US)

(72) Inventor: Robert A White, III, Meriden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/179,693

(22) Filed: Mar. 7, 2023

(65) Prior Publication Data

US 2023/0203961 A1 Jun. 29, 2023

Related U.S. Application Data

(63) Continuation of application No. 17/245,690, filed on Apr. 30, 2021, now Pat. No. 11,619,138.

(51) Int. Cl.
*F01D 11/08* (2006.01)

(52) U.S. Cl.
CPC .......... *F01D 11/08* (2013.01); *F05D 2220/32* (2013.01); *F05D 2230/232* (2013.01); *F05D 2230/60* (2013.01); *F05D 2240/56* (2013.01)

(58) Field of Classification Search
CPC ... F01D 11/08; F05D 2240/56; F05D 2240/11
See application file for complete search history.

(56) References Cited

U.S. PATENT DOCUMENTS

| | | | | |
|---|---|---|---|---|
| 5,074,748 A | * | 12/1991 | Hagle | F16J 15/3288 277/355 |
| 6,250,879 B1 | * | 6/2001 | Lampes | F16J 15/3288 415/231 |
| 6,328,311 B1 | * | 12/2001 | Plona | F16J 15/3288 277/355 |
| 7,458,584 B2 | * | 12/2008 | Addis | F16J 15/3288 277/355 |
| 7,862,047 B2 | * | 1/2011 | Beichl | F16J 15/3288 277/355 |
| 10,400,896 B2 | * | 9/2019 | Davis | F01D 11/005 |
| 10,787,923 B2 | | 9/2020 | Clark et al. | |

(Continued)

OTHER PUBLICATIONS

European Search Report for European Patent Application No. 22170346.5 dated Sep. 14, 2022.

*Primary Examiner* — Eldon T Brockman
(74) *Attorney, Agent, or Firm* — Carlson, Gaskey & Olds, P.C.

(57) ABSTRACT

A seal assembly for a gas turbine engine according to an example of the present disclosure includes, among other things, a first side plate, a second side plate and a backing plate that extend circumferentially about an assembly axis. A first brush seal and a second brush seal are positioned on opposite sides of the backing plate such that the first brush seal is between the first side plate and the backing plate and such that the second brush seal is between the second side plate and the backing plate. The first brush seal is dimensioned to establish a first sealing relationship with a first gas turbine engine component. The second brush seal is dimensioned to establish a second sealing relationship with a second gas turbine engine component. A method of assembly is also disclosed.

12 Claims, 8 Drawing Sheets

(56) References Cited

U.S. PATENT DOCUMENTS

| | | | |
|---|---|---|---|
| 10,935,139 B2* | 3/2021 | Davis | B23K 31/02 |
| 11,261,971 B2* | 3/2022 | Barker | F01D 11/001 |
| 2008/0128996 A1* | 6/2008 | Grace | F16J 15/3288 |
| | | | 277/355 |
| 2008/0203671 A1* | 8/2008 | Addis | F16J 15/3288 |
| | | | 277/355 |
| 2010/0327535 A1 | 12/2010 | Grace et al. | |
| 2016/0061330 A1* | 3/2016 | Davis | F01D 25/246 |
| | | | 228/136 |
| 2019/0032786 A1* | 1/2019 | Davis | F01D 11/005 |
| 2019/0063249 A1* | 2/2019 | McCaffrey | F01D 25/24 |
| 2019/0309642 A1 | 10/2019 | Roy Thill | |
| 2020/0040750 A1* | 2/2020 | Greene | F01D 11/005 |
| 2021/0140546 A1* | 5/2021 | Barker | F01D 11/001 |

* cited by examiner

DOUBLE BRUSH SEAL ASSEMBLY

CROSS-REFERENCE TO RELATED APPLICATION

This application is a continuation application of U.S. application Ser. No. 17/245,690, filed on Apr. 30, 2021.

BACKGROUND

This disclosure relates to gas turbine engines, and more particularly to sealing arrangements incorporating brush seals.

Gas turbine engines typically include a compressor section and a turbine section. The air is compressed in the compressor section. From the compressor section the air is introduced into a combustor section where it is mixed with fuel and ignited in a combustor. Products of this combustion pass downstream over a turbine section to extract energy for driving the compressor section. The components may be exposed to hot gases in the gas path. Various cooling schemes may be utilized to cool portions of the components. A seal may be utilized to limit flow of hot gases from the gas path and/or cooling flow into the gas path.

SUMMARY

A seal assembly for a gas turbine engine according to an example of the present disclosure includes a first side plate, a second side plate and a backing plate that extend circumferentially about an assembly axis. A first brush seal and a second brush seal are positioned on opposite sides of the backing plate such that the first brush seal is between the first side plate and the backing plate and such that the second brush seal is between the second side plate and the backing plate. The first brush seal is dimensioned to establish a first sealing relationship with a first gas turbine engine component. The second brush seal is dimensioned to establish a second sealing relationship with a second gas turbine engine component.

In a further embodiment of any of the foregoing embodiments, a portion of the first gas turbine engine component that establishes the first sealing relationship comprises a ceramic material.

In a further embodiment of any of the foregoing embodiments, the first gas turbine engine component is a turbine vane or a blade outer air seal.

In a further embodiment of any of the foregoing embodiments, the second side plate includes a plate body and an annular flange extending circumferentially about the assembly axis. The annular flange is dimensioned to engage an outer periphery of the second gas turbine engine component.

In a further embodiment of any of the foregoing embodiments, the first brush and the second brush seal extend radially inward from an inner periphery of the backing plate relative to the assembly axis.

In a further embodiment of any of the foregoing embodiments, the backing plate includes a main body extending between the inner periphery and an outer periphery and extending between first and second sidewalls on opposite sides of the main body. The first and second sidewalls are dimensioned such that the first and second brush seals slope outwardly from the outer periphery of the backing plate towards the inner periphery of the backing plate.

In a further embodiment of any of the foregoing embodiments, the first brush seal includes a first bristle pack welded to the first side plate and the backing plate and the second brush seal includes a second bristle pack welded to the second side plate and the backing plate to establish a unitary construction.

In a further embodiment of any of the foregoing embodiments, the first side plate includes a plurality of protrusions that interfit with recesses associated with the first gas turbine engine component to limit relative rotation.

In a further embodiment of any of the foregoing embodiments, the backing plate includes a plurality of scallops circumferentially distributed about a periphery of the backing plate.

A gas turbine engine according to an example of the present disclosure includes a section having an array of blades rotatable about a longitudinal axis, an array of vanes adjacent to the array of blades, and an array of blade outer air seals arranged circumferentially about the array of blades relative to the longitudinal axis. A seal assembly is dimensioned to span between the array of vanes and the array of blade outer air seals. The seal assembly includes a first side plate, a second side plate and a backing plate that extend circumferentially about the longitudinal axis, a first brush seal between the first side plate and the backing plate, and a second brush seal between the second side plate and the backing plate. The first brush seal is dimensioned to establish a first sealing relationship with the array of vanes, and the second brush seal is dimensioned to establish a second sealing relationship with the array of blade outer air seals.

In a further embodiment of any of the foregoing embodiments, array of vanes and the array of blade outer air seals establish an axial gap relative to the longitudinal axis. The axial gap extends from a core flow path, and the seal assembly is dimensioned to span the axial gap.

In a further embodiment of any of the foregoing embodiments, the first and second brush seals extend radially inward from an inner periphery of the backing plate to establish the first and second sealing relationships.

In a further embodiment of any of the foregoing embodiments, each of the vanes includes an airfoil section extending from a platform section that bounds a gas path, the platform section is arranged to establish the first sealing relationship with the first brush seal, and the platform section comprises a ceramic material.

In a further embodiment of any of the foregoing embodiments, each of the vanes includes a metallic spar member secured to a fairing. The fairing comprises a ceramic matrix composite material that establishes the airfoil section and the platform section, and the seal assembly is trapped between one or more of the spar members and one or more of the blade outer air seals.

In a further embodiment of any of the foregoing embodiments, the second side plate includes a plate body and an annular flange that extends circumferentially about the longitudinal axis, and the annular flange is dimensioned to engage an outer periphery of two or more of the blade outer air seals to secure the seal assembly to an engine static structure.

In a further embodiment of any of the foregoing embodiments, the first brush seal is dimensioned to extend in a first axial direction from the backing plate relative to the longitudinal axis such that the first sealing relationship is established along an axial face associated with the array of vanes. The second brush seal is dimensioned to extend in a second axial direction from the backing plate relative to the longitudinal axis such that the second sealing relationship is established along an axial face associated with the array of blade outer air seals.

A method of assembly for a gas turbine engine according to an example of the present disclosure includes positioning a first brush seal and a second brush seal on opposite sides of an annular backing plate, positioning the first and second brush seals between a first side plate and a second side plate, mechanically attaching the first and second brush seals to the first and second side plates and the backing plate to establish a seal assembly, and positioning the seal assembly such that the first brush seal establishes a first sealing relationship with a first gas turbine engine component and such that the second brush seal establishes a second sealing relationship with a second gas turbine engine component adjacent to the first gas turbine engine component.

In a further embodiment of any of the foregoing embodiments, a portion of the first gas turbine engine component that establishes the first sealing relationship comprises a ceramic matrix composite material.

In a further embodiment of any of the foregoing embodiments, the mechanically attaching step includes welding the first and second brush seals to the backing plate and to respective ones of the first and second side plates to establish a unitary construction prior to the step of positioning the seal assembly.

In a further embodiment of any of the foregoing embodiments, the backing plate includes a plurality of scallops circumferentially distributed about a periphery of the backing plate.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
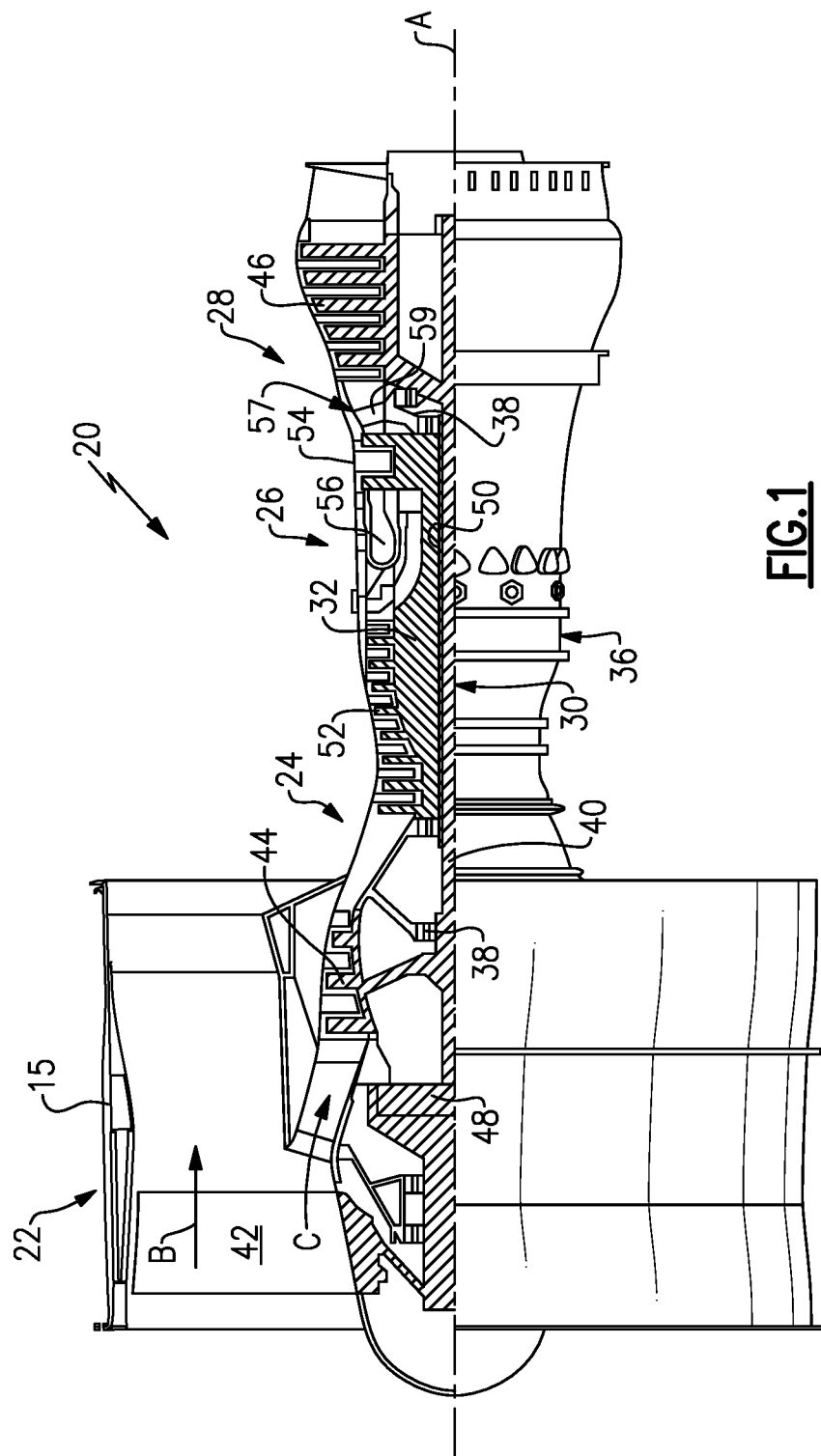
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
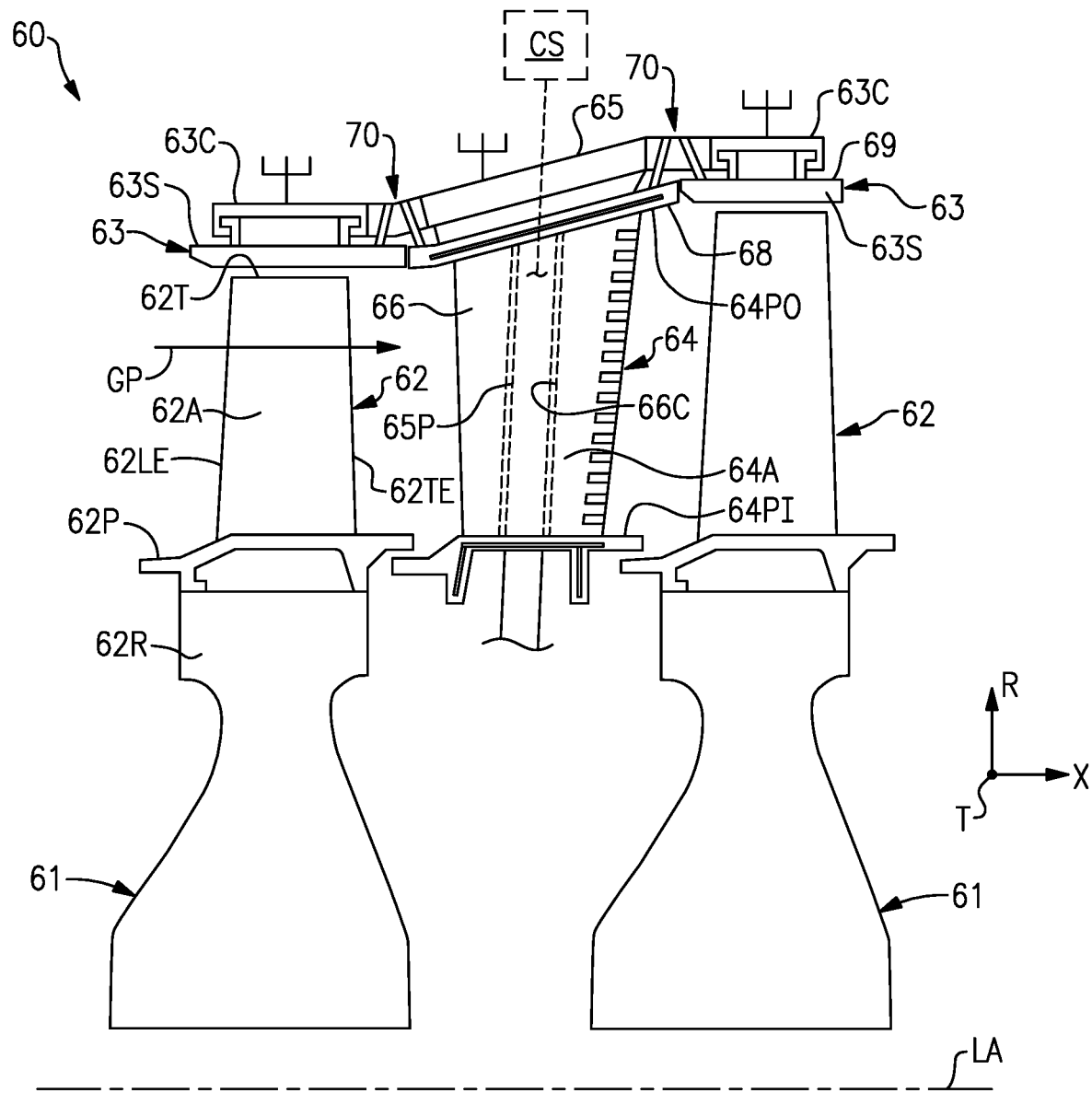
FIG. 2 shows an airfoil arrangement for a section of a gas turbine engine.

FIG. 2 illustrates an exemplary section 60 for a gas turbine engine. The section 60 may be incorporated into the gas turbine engine 20 of FIG. 1, such as the compressor section 24 or the turbine section 28. The section 60 includes a rotor 61 carrying one or more blades or airfoils 62 that are rotatable about a longitudinal axis LA. The longitudinal axis LA may be collinear or otherwise parallel to the engine axis A of FIG. 1.

Each airfoil 62 includes a platform 62P and an airfoil section 62A extending in a radial direction R from the platform 62P to a tip 62T. The airfoil section 62A generally extends in a chordwise or axial direction X between a leading edge 62LE and a trailing edge 62TE. A root section 62R of the airfoil 62 is mounted to, or integrally formed with, the rotor 61. A blade outer air seal (BOAS) 63 is spaced radially outward from the tip 62T of the adjacent airfoil 62. The BOAS 63 can include a plurality of seal arc segments that are circumferentially arranged in an annulus around the longitudinal axis LA. The tip 62T of the airfoil section 62A and adjacent BOAS 63 are arranged in close radial proximity to reduce the amount of gas flow that is redirected toward and over the rotating blade airfoil tip 62T through a corresponding clearance gap.

The BOAS 63 can include one or more seal arc segments 63S mounted or otherwise secured to one or more carriers 63C. Each carrier 63C can be secured to an engine static structure such as the engine case 37 or another portion of the engine static structure 36 of FIG. 1.

A vane 64 can be positioned along the longitudinal axis LA and adjacent to the airfoil 62. The vane 64 includes an airfoil section 64A extending between an inner platform 64PI and an outer platform 64PO to define a portion of the gas path GP. The inner platform 64PI and outer platform 64PO are dimensioned to bound radially inner and outer portions of the gas path GP.

Each vane 64 can include a spar member 65 secured to a fairing 66. The spar member 65 may include a portion 65P at least partially received in a cavity 66C of the fairing 66. The portion 65P may be a hollow strut or conduit that extends radially inwardly towards the longitudinal axis LA. The spar member 65 may be secured to the engine static structure. The spar member 65 may be a load bearing structure that is dimensioned to at least partially support a respective fairing 66.

The spar member 65 may be coupled to a coolant source CS (shown in dashed lines for illustrative purposes). The coolant source CS can be configured to supply or convey pressurized cooling flow to cool portions of the section 60 including each vane 64. The coolant source CS can include bleed air from an upstream stage of the compressor section 24 (FIG. 1), bypass air, or a secondary cooling system aboard the aircraft, for example. Various materials may be utilized to form the spar member 65 and fairing 66. The spar member 65 may be formed of a metallic material, such as a high temperature metal or alloy. The fairing 66 can be a monolithic component formed of a ceramic material, such as a ceramic matrix composite (CMC) material that establishes the airfoil section 64A and/or platform sections 64PI, 64PO. The CMC materials disclosed herein may include continuous or discontinuous fibers in a matrix arranged in one or more layers to establish a CMC layup.

The section 60 can include an array of airfoils 62, an array of vanes 64, and an array of BOAS 63 arranged circumferentially about the longitudinal axis LA. The array of the BOAS 63 can be distributed in a circumferential or thickness direction T about an array of the airfoils 62 to bound a gas path GP, such as the core flow path C of FIG. 1.

The section 60 can include one or more seal assemblies 70. Each seal assembly 70 can be arranged to establish sealing relationships with one or more adjacent gas turbine engine components of the section 60, such as a first gas turbine engine component 68 and second gas turbine engine component 69 adjacent the gas path GP. The first component 68 can be an adjacent vane(s) 64, and the second component 69 can be an adjacent BOAS 63 as illustrated in FIG. 2, or vice versa. The section 60 can include two or more seal assemblies 70 distributed along the longitudinal axis LA to establish sealing relationships that limit flow to and/or from the gas path GP.

Figure 3:
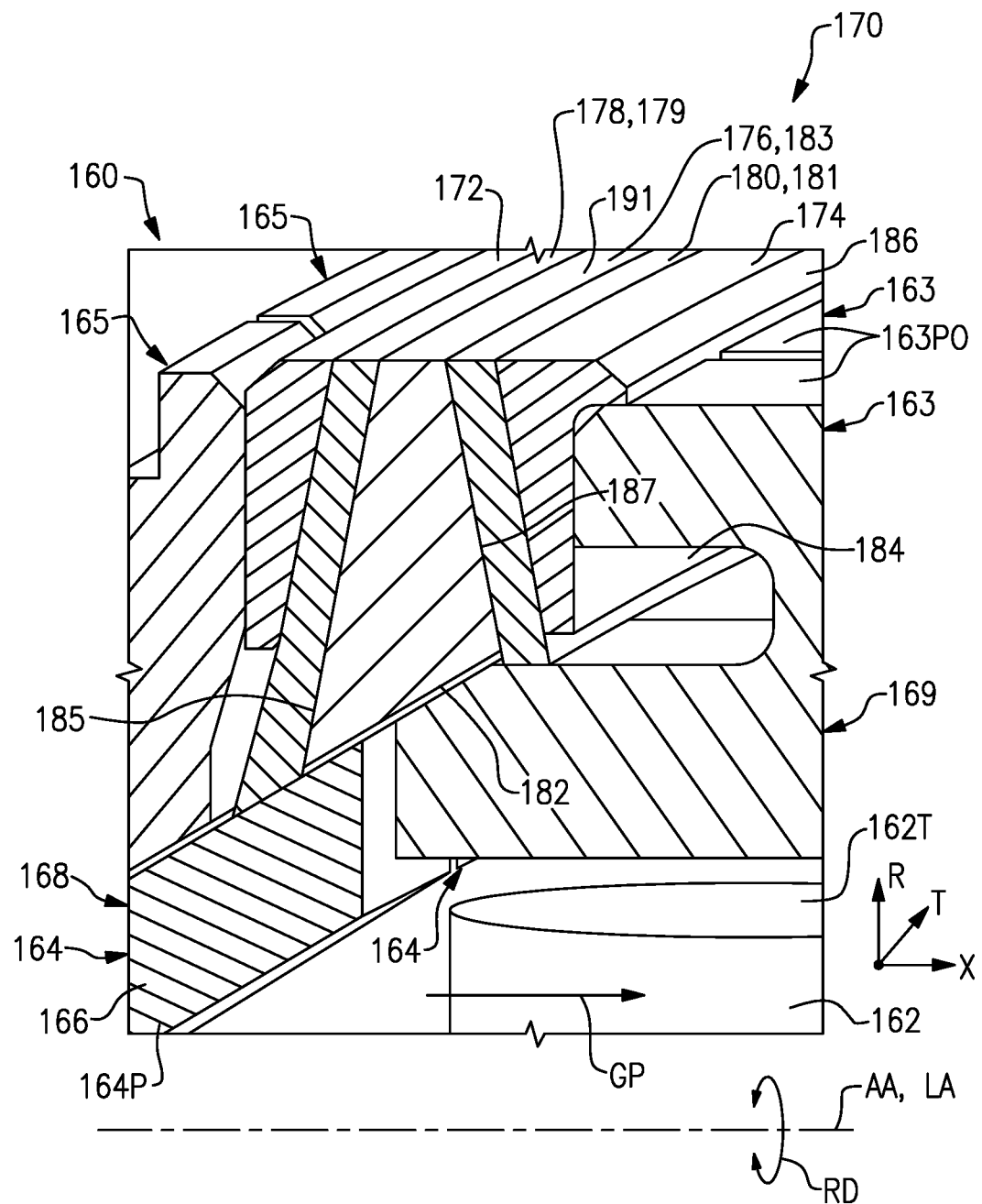
FIG. 3 illustrates a perspective, sectional view of a section including a seal assembly.
Figure 4:
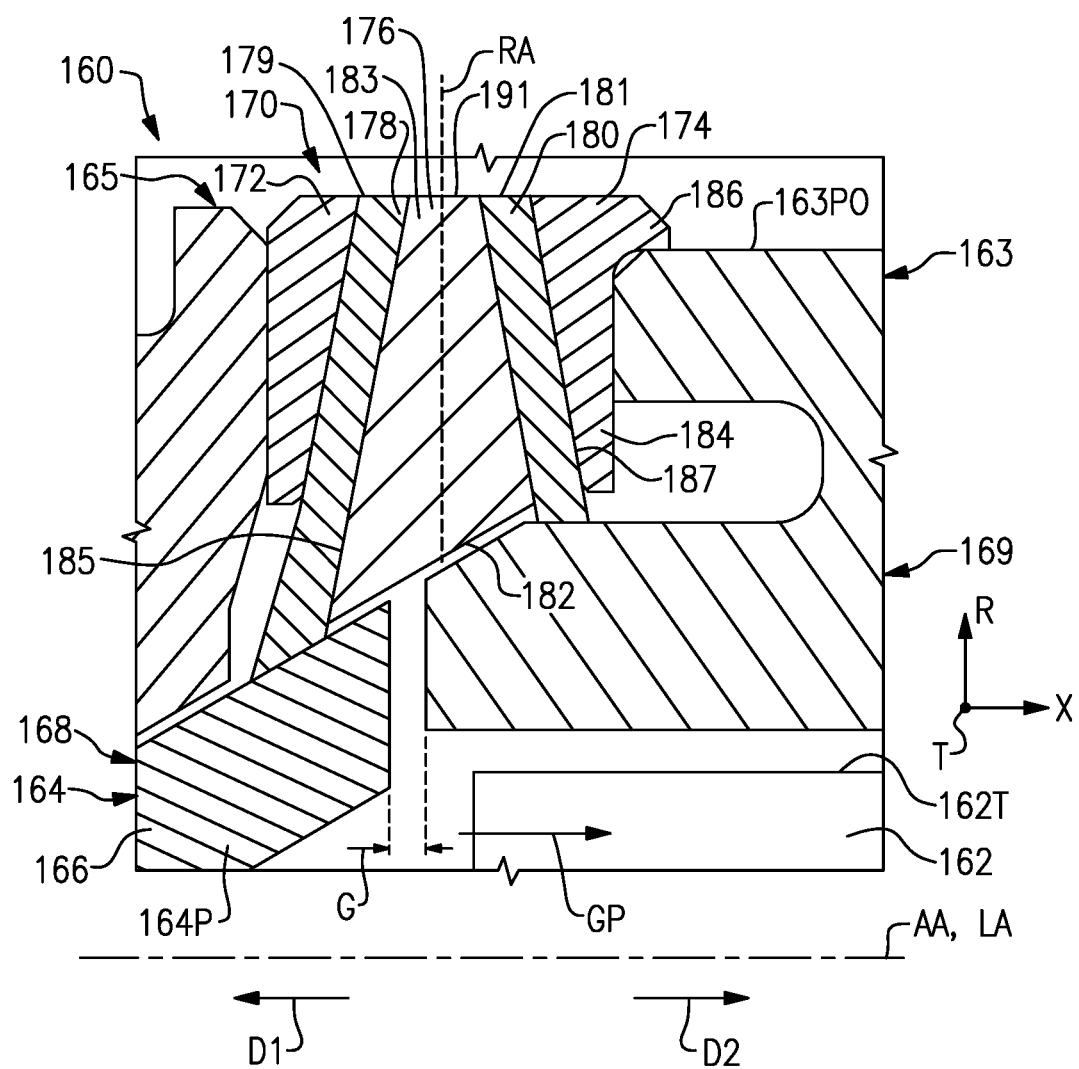
FIG. 4 illustrates a sectional view of the section of FIG. 3.
Figure 5:
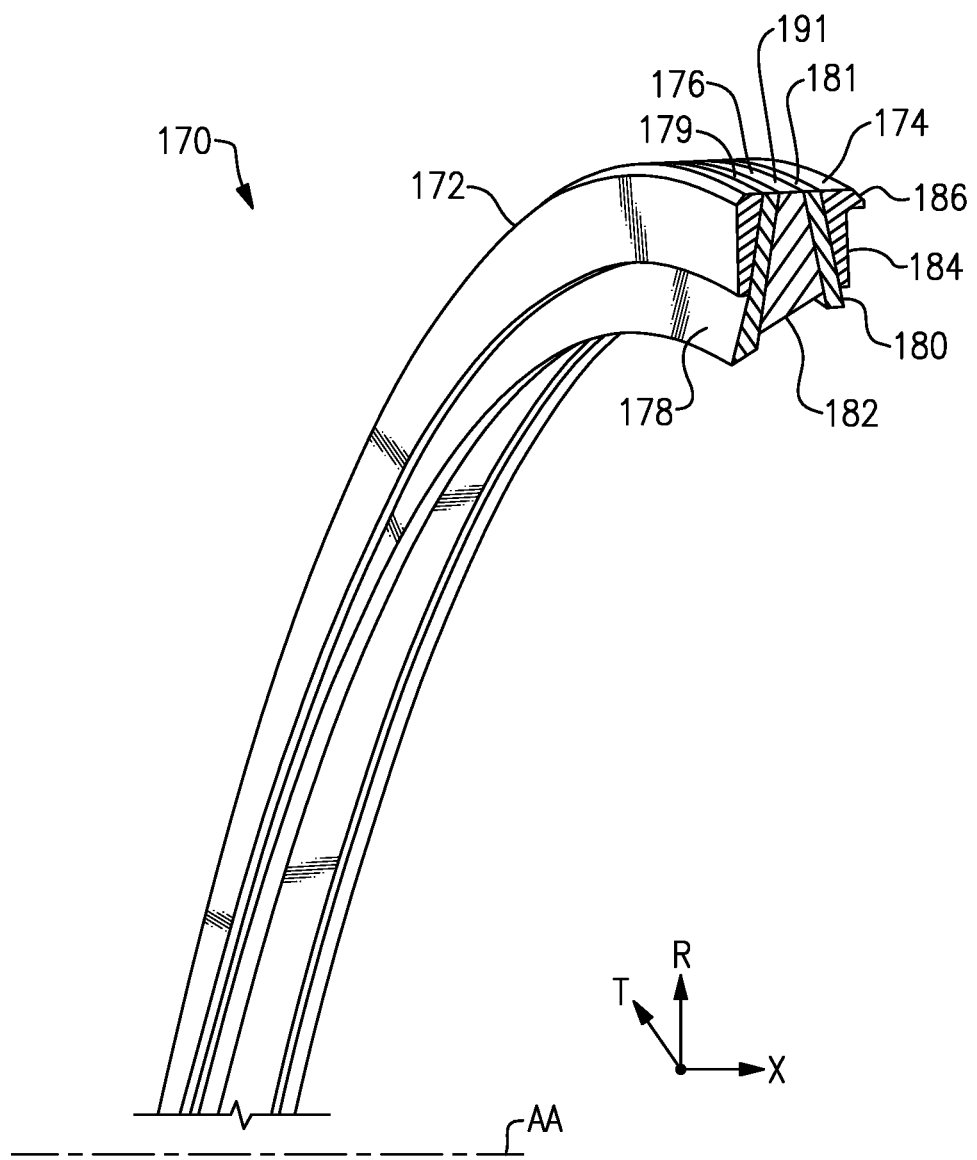
FIG. 5 illustrates an isolated view of the seal assembly of FIG. 3.

FIGS. 3-4 illustrate an exemplary seal assembly 170 for a section 160 of a gas turbine engine. The section 160 and seal assembly 170 may be incorporated into a section of the gas turbine engine 20 of FIGS. 1 and/or 2, such as the turbine section 28. Other portions of the gas turbine engine 20 and other systems may benefit from the teachings disclosed herein, including gas turbine engines lacking a fan for propulsion. In this disclosure, like reference numerals designate like elements where appropriate and reference numerals with the addition of one-hundred or multiples thereof designate modified elements that are understood to incorporate the same features and benefits of the corresponding original elements. The seal assembly 170 can be arranged to establish sealing relationships with non-rotating or static components and/or rotating components such as shafts and bearing arrangements (e.g., inner shaft 40 or outer shaft 50 of FIG. 1).

The seal assembly 170 can include a first side plate 172, second side plate 174, backing plate 176, first brush seal 178 and second brush seal 180. The first side plate 172, second side plate 174, backing plate 176 and brush seals 178, 180 can be dimensioned to extend circumferentially about an assembly axis AA, as illustrated in FIG. 3. The assembly axis AA may be colinear with or otherwise parallel to a longitudinal axis LA of the section 160. The seal assembly 170 can be dimensioned to extend along an array of vanes 164 and/or array of BOAS 163 in the circumferential direction T as illustrated in FIG. 3 and/or span between the array of vanes 164 and array of BOAS 163 in the axial direction X as illustrated by FIG. 4. Each of the first side plate 172, second side plate 174, backing plate 176 and/or brush seals 178, 180 can be a full hoop or can include one or more arc segments dimensioned to extend at least partially or completely about the assembly axis AA.

The first and second brush seals 178, 180 may cooperate to establish a double brush seal arrangement. The first brush seal 178 can include a first bristle pack 179. The second brush seal 180 can include a second bristle pack 181. Each bristle pack 179, 181 can include a set of bristles that are joined together as a unit. The bristles may be formed of non-metallic materials or metallic materials such as high temperature metal or nickel-based alloy. The seal assembly 170 can have a unitary construction. The bristle packs 179, 181 may be arranged in a compressed state between the side plates 172, 174 and backing plate 176. The first bristle pack 179 can be welded or otherwise mechanically attached to the first side plate 172 and backing plate 176 and the second bristle pack 181 can be welded or otherwise mechanically attached to the second side plate 174 and backing plate 176 to establish the unitary construction.

The first brush seal 178 and second brush seal 180 can be arranged in various configurations. The first and second brush seals 178, 180 can be positioned on opposite sides of the backing plate 176. The first brush seal 178 can be sandwiched or otherwise situated between the first side plate 172 and backing plate 176. The second brush seal 180 can be sandwiched or otherwise situated between the second side plate 174 and backing plate 176. In some implementations, the first and/or second side plates 172, 174 are omitted.

The first and second brush seals 178, 180 can be arranged at various positions and/or orientations relative to each other and one or more gas turbine engine components to establish respective sealing relationships. The brush seals 178, 180 can be dimensioned to extend radially inward and/or radially outward in the same or different directions relative to the assembly axis AA, or can be dimensioned to extend axially in the same or different directions relative to the assembly axis AA. The first brush seal 178 can be dimensioned to establish a first sealing relationship with a first gas turbine engine component 168. The second brush seal 180 can be dimensioned to establish a second seal relationship with a second gas turbine engine component 169. The gas turbine engine components 168, 169 can include any of the components disclosed herein. The components 168, 169 can be different portions of the same gas turbine engine component or can be separate and distinct components. For example, the first component 168 can be a turbine vane or associated mounting structure, such as the vane 164, and the second component 169 can be a BOAS or associated mounting structure, such as the BOAS 163 or the carrier 63C (FIG. 2). In the illustrated example of FIG. 3, the first brush seal 178 is dimensioned to establish a first sealing relationship with the array of vanes 164, and the second brush seal 180 is dimensioned to establish the second sealing relationship with the array of blade outer air seals 163.

Various materials may be utilized to form the first and second components 168, 169, including any of the materials disclosed herein. For example, portions of the first and/or second components 168, 169 that establish the respective first and/or second sealing relationships may comprise a ceramic material such as a monolithic ceramic or CMC material. Monolithic ceramics may be, but are not limited to, silicon carbide (SiC) or silicon nitride ($Si_3N_4$).

The array of vanes 164 and array of BOAS 163 can establish an axial gap G relative to the longitudinal axis LA, as illustrated in FIG. 4. The axial gap G extends outwardly from a gas path GP such as the core flow path C of FIG. 1. The seal assembly 170 can be dimensioned to span the axial gap G between adjacent vanes 164 and BOAS 163.

Each of the vanes 164 can include a fairing 166 that establishes a platform section 164P of the vane 164. The platform section 164P can be one of the platform sections 64PI, 64PO of the vane 64 of FIG. 2, such as the outer platform section 64PO. The platform section 164P can be arranged to establish the first and/or sealing relationships with the respective brush seal 178, 180, such as the first brush seal 178 as illustrated in FIGS. 3-4, and can comprise any of the materials disclosed herein.

The first and second brush seals 178, 180 can be dimensioned to extend radially inward in the radial direction R from an inner periphery 182 of the backing plate 176 relative to the assembly axis AA to establish the first and second sealing relationships. The first and second brush seals 178, 180 can be dimensioned such that the first and second sealing relationships are established at the same radial position or at different radial positions relative to the longitudinal axis LA as illustrated in FIG. 4.

Various techniques may be utilized to secure the seal assembly 170. The seal assembly 170 may be dimensioned to be trapped between one or more (or each) of the spar members 165 and one or more (or each) of the BOAS 163 opposing the spar members 165 in an installed position, as illustrated in FIGS. 3-4. In the installed position, the spar members 165 and BOAS 163 cooperate to limit axial movement of the seal assembly 170 relative to the longitudinal axis LA.

The second side plate 174 can include a plate body 184 and an annular flange 186 extending outwardly from the plate body 184. The annular flange 186 can be dimensioned to extend circumferentially in the circumferential direction T about the assembly axis AA. The annular flange 186 can be dimensioned to engage an outer periphery of the second component 169 (or first component 168), such as an outer periphery 163PO of two or more BOAS 163 as illustrated in FIG. 3 to secure the seal assembly 170 to an engine static structure, such as the engine static structure 36 of FIG. 1. Engagement between the annular flange 186 and second component 169 can limit radial movement of the seal assembly 170 in the radial direction R relative to the longitudinal axis LA.

The brush seals 178, 180 can be arranged at various orientations relative to each other to establish the respective sealing relationships. The backing plate 176 can have a generally quadrilateral or trapezoidal cross sectional geometry. The backing plate 176 can include a main body 183 extending radially between the inner periphery 182 and an outer periphery 191 and circumferentially between first and second sidewalls 185, 187 on opposite sides of the main body 183. The inner and outer peripheries 182, 191 can be substantially parallel to each other or can be transverse as illustrated in FIG. 4. The sidewalls 185, 187 can be substantially parallel to each other or can be transverse as illustrated in FIG. 4.

The sidewalls 185, 187 can be dimensioned such that the brush seals 178, 180 slope outwardly from the outer periphery 191 of the backing plate 176 towards the inner periphery 182 of the backing plate 176. The first sidewall 185 can be dimensioned such that the first brush seal 178 slopes outwardly from the outer periphery 191 in a first direction D1 relative to the assembly axis AA. The second sidewall 187 can be dimensioned such that the second brush seal 180 slopes outwardly from the outer periphery 191 in a second direction D2 relative to the assembly axis AA, as illustrated in FIG. 4. The second direction D2 can be opposed to the first direction D1. The sidewalls 185, 187 can be dimensioned to have a major component in the radial direction R and a minor a component in the axial direction X to establish the sloping arrangement. For example, the first and/or second brush seals 178, 180 can be angled approximately 5 degrees to approximately 45 degrees relative to a radial axis RA extending in the radial direction R (RA shown in dashed lines in FIG. 4 for illustrative purposes). For the purposes of this disclosure, the terms "substantially" and "approximately" mean ±5 percent of the stated value or relationship unless otherwise indicated.

Figure 6:
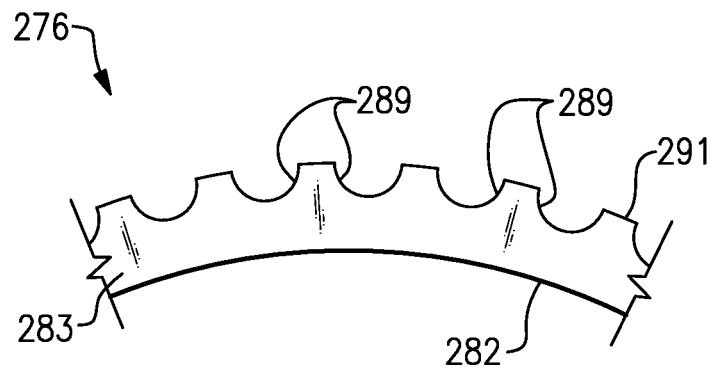
FIG. 6 illustrates a seal assembly according to another example.

The backing plate 176 can include various weight reduction features. In the illustrative example of FIG. 6, backing plate 276 includes one or more scallops 289 formed in a main body 283 of the backing plate 276. The backing plate 276 can include a plurality of scallops 289 circumferentially distributed about a periphery of the backing plate 276, such as an outer periphery 291. The scallops 289 can be formed in the backing plate 276 to reduce an overall weight of the seal assembly.

Figure 7:
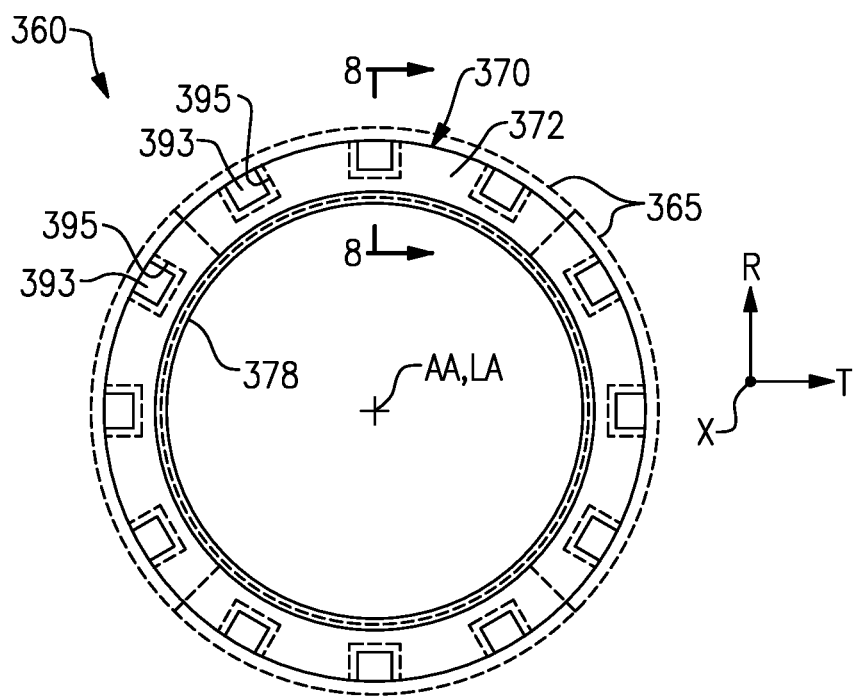
FIG. 7 illustrates a seal assembly according to yet another example.
Figure 8:
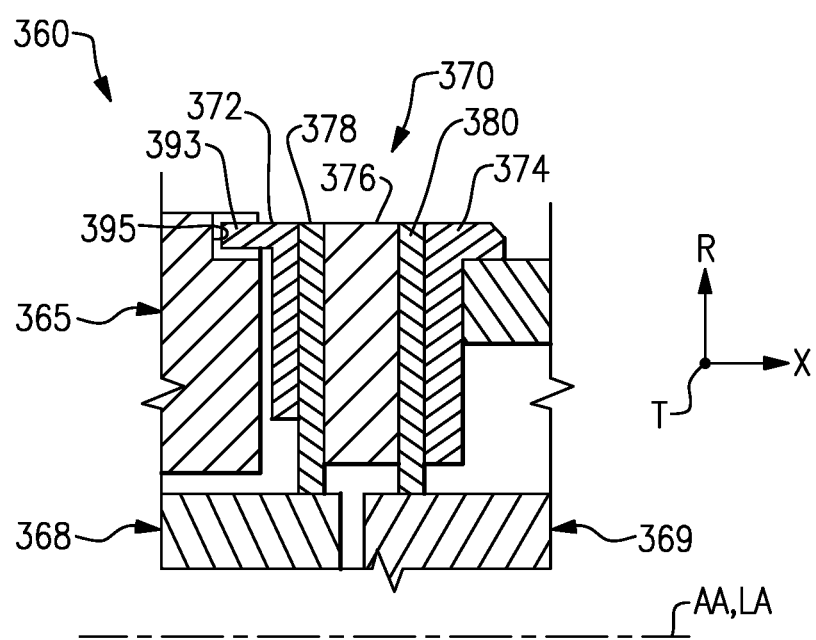
FIG. 8 illustrates a sectional view of the seal assembly of FIG. 7.

FIGS. 7-8 illustrate a section 360 including a seal assembly 370 according to another example. The seal assembly 370 can include one or more anti-rotation features that clock the seal assembly 370 and limit relative movement between the seal assembly 370 and adjacent components 368, 369. In implementations, the anti-rotation features can include one or more protrusions or keys 393 that may mate or interfit with respective recesses or keyways 395 associated with the components 368, 369 to limit relative rotation. The keys 393 may extend outwardly from one of the side plates 372, 374, such as the first side plate 372. The keyways 395 may be established in the one of the gas turbine engine components 368, 369 or associated support structure, such as one or more of the spars 365 (shown in dashed lines in FIG. 7 for illustrative purposes). Each keyway 395 is dimensioned to interfit with a respective one of the keys 393 to limit circumferential movement in the circumferential direction T between the seal assembly 370 and adjacent components 368, 369. The section 360 can include an array of the keys 393 and keyways 395 distributed about the longitudinal axis LA. In implementations, the anti-rotation features are incorporated in the second side plate 374 and the second component 369 or associated structure.

Figure 9:
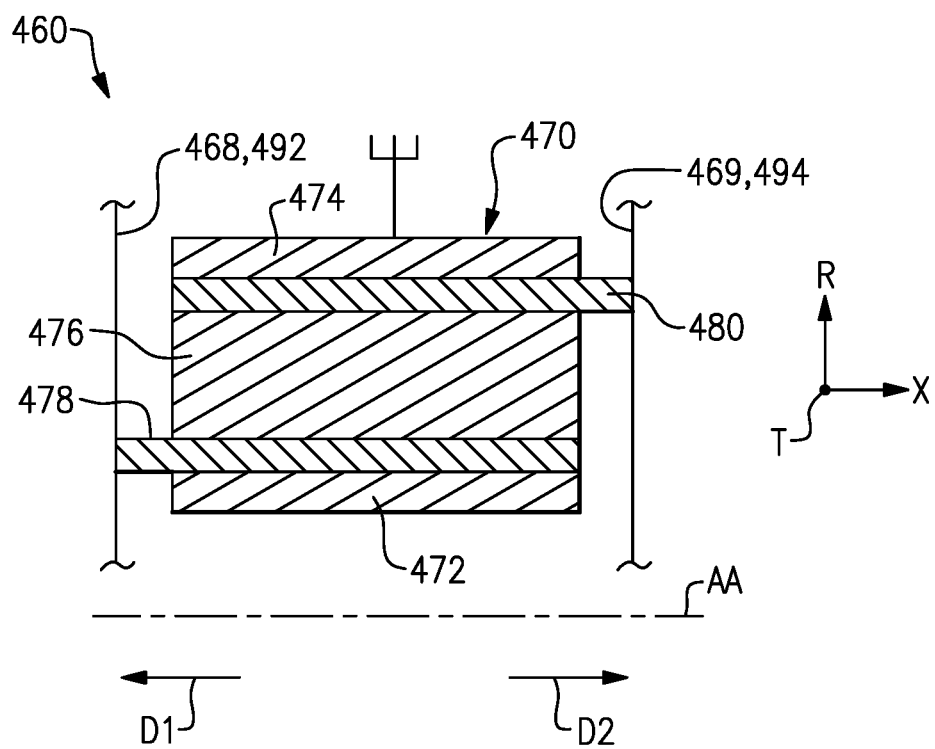
FIG. 9 illustrates a seal assembly according to another example.

FIG. 9 illustrates a seal assembly 470 according to another example. The seal assembly 470 can be secured to an engine static structure, including any of the static structures disclosed herein. The seal assembly 470 includes a first brush seal 478 and a second brush seal 480. The first brush seal 478 is dimensioned to establish a first sealing relationship with a first gas turbine engine component 468. The second brush seal 480 is dimensioned to establish a second sealing relationship with a second gas turbine engine component 469.

The first brush seal 478 can be dimensioned to extend in a first axial direction D1 from a backing plate 476 relative to an assembly axis AA such that the first sealing relationships established along an axial face 492 of the first component 468. The axial face 492 may be established by one or more of the spar members 165 of FIGS. 3-4, for example. The second brush seal 480 can be dimensioned to extend in a second axial direction D2 from the backing plate 476 relative to the assembly axis AA such that a second sealing relationship is established along an axial face 494 of the second component 469. The second axial direction D2 can be opposed to the first axial direction D1. The axial face 494 may be established by one or more BOAS 163 of FIGS. 3-4 or one or more carriers 63C associated with the BOAS 63 of FIG. 2, for example. In other implementations, the brush seals 478, 480 extend generally in the same direction.

Figure 10:
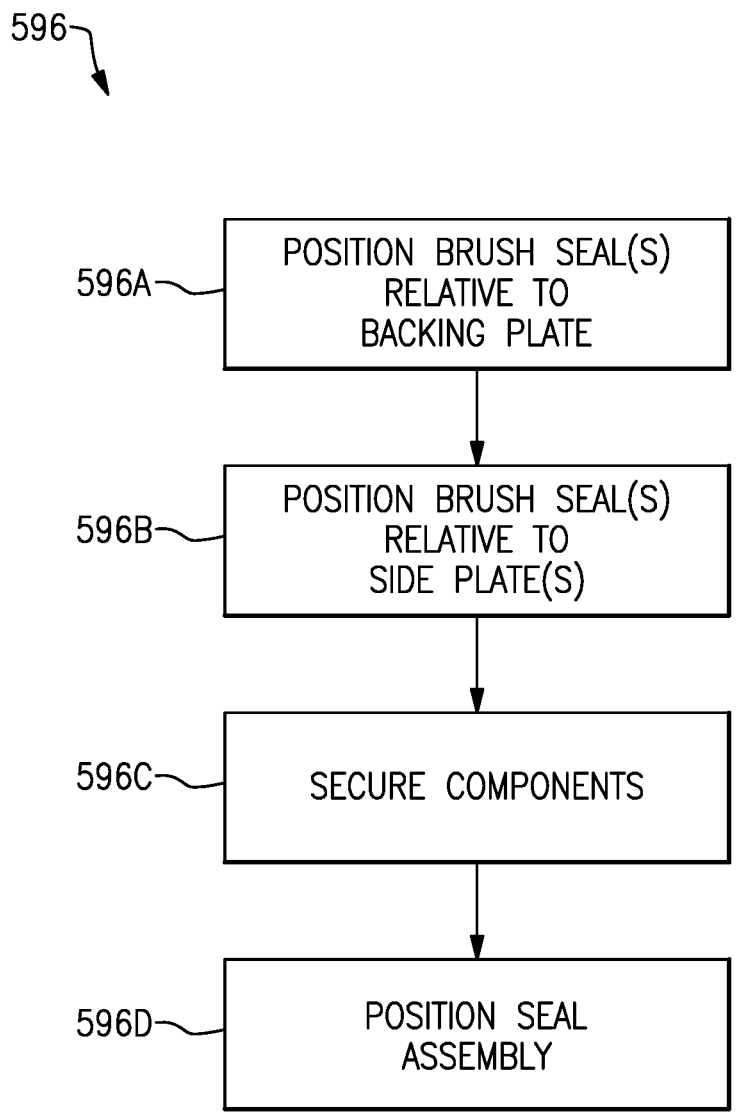
FIG. 10 illustrates an exemplary method of assembly.

FIG. 10 illustrates an exemplary method of assembly for a gas turbine engine in a flowchart 596. The method may be utilized to assemble any of the sections and seal assemblies disclosed herein. Reference is made to the seal assembly 170 of FIGS. 3-4 for illustrative purposes.

At step 596A, the first brush seal 178 and second brush seal 180 are positioned relative the backing plate 176. Step 596A can include positioning the first brush seal 178 and second brush seal 180 on opposite sides of the backing plate 176.

At step 596B, the first brush seal 178 and second brush seal 180 are positioned relative to the first side plate 172 and second side plate 174. Step 596B can include positioning the first and second brush seals 178, 180 between the side plates 172, 174 such that the first brush seal 178 is sandwiched between the first side plate 172 and backing plate 176 and such that the second brush seal 180 is sandwiched between the second side plate 174 and backing plate 176.

At step 596C, two or more of the components can be secured together to establish the seal assembly 170, including the first and second brush seals 178, 180, first and second plates 172, 174 and/or backing plate 176. Various techniques can be utilized to secure the components, including any of the techniques disclosed herein. Step 596C can include mechanically attaching the brush seals 178, 180 to the backing plate 176 and respective ones of the side plates 172, 174 to establish the seal assembly 170. Step 596C can include welding the brush seals 178, 180 to the backing plate 176 and to respective ones of the side plates 172, 174 to establish a unitary construction, which can occur prior to positioning the seal assembly 170 relative to one or more gas turbine engine components 168, 169. In other implementations, the brush seals 178, 180 are crimped to secure the brush seals 178, 180 to the side plates 172, 174 and backing plate 176.

At step 596D, the seal assembly 170 is positioned such that the first brush seal 178 establishes a first sealing relationship with a first gas turbine engine component 168 and such that the second brush seal 180 establishes a second sealing relationship with a second gas turbine engine component 169. The second component 169 can be adjacent to the first gas turbine engine component 168. A portion of the first component 168 that establishes the first sealing relationship and/or a portion of the second component 169 that establishes the second sealing relationship can comprise any of the materials disclosed herein, including a ceramic material such as a monolithic ceramic or CMC material.

Step 596D can include positioning the seal assembly 170 as a single unit established at step 596C relative to the components 168, 169. In other implementations, step 596A, 596B and/or 596C can occur during and/or subsequent to step 596D. Step 596D can include positioning the seal assembly 170 at any of the positions and/or orientations disclosed herein. Step 596D can include positioning the seal assembly 170 to span across a gap between the adjacent components 168, 169, such as the axial gap G of FIG. 4.

The bristles of the brush seals 178, 180 may be angled in the circumferential direction prior to positioning the seal assembly 170 in the section 160. For example, the bristles may be oriented at an approximately 45 degree angle in a clockwise or counterclockwise direction. Step 596D can include rotating the seal assembly 170 about the longitudinal axis LA in an opposed clockwise or counterclockwise direction subsequent to positioning the seal assembly 170 in abutment with the first and/or second components 168, 169 to establish an interference fit between the brush seals 178, 180 and respective components 168, 169.

The disclosed seal assemblies can be utilized to establish a double seal arrangement. The brush seals may be packaged in a single unit, which may reduce assembly time and complexity. The disclosed seal assemblies may improve sealing effectiveness and reduce parts counts by utilizing a common backing plate for the brush seals. The disclosed seal assemblies may be relatively more compact, which may facilitate incorporation of the seal assemblies in reduced space designs. The disclosed seal assemblies may reduce the need to incorporate one or more face seals that may otherwise extend between the backing plate and mating hardware, which can reduce complexity and weight. The seal assemblies may be utilized to establish sealing relationships with components incorporating CMC materials, which may be associated with relatively greater leaking paths and variability due to interaction between the CMC components and metallic support.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
    a first side plate, a second side plate and a backing plate that extend circumferentially about an assembly axis;
    a first brush seal and a second brush seal;
    wherein the first and second brush seals are spaced apart by, and positioned on opposite sides of, the backing plate, the first brush seal is between the first side plate and the backing plate, the second brush seal is between the second side plate and the backing plate, the first brush seal is dimensioned to establish a first sealing relationship with a first gas turbine engine component, and the second brush seal is dimensioned to establish a second sealing relationship with a second gas turbine engine component; and
    wherein the backing plate includes a main body extending between the inner periphery and an outer periphery and extending between first and second sidewalls on opposite sides of the main body, and wherein the first and second sidewalls are dimensioned such that the first and second brush seals slope outwardly from the outer periphery of the backing plate towards the inner periphery of the backing plate.

2. The assembly as recited in claim 1, wherein a portion of the first gas turbine engine component that establishes the first sealing relationship comprises a ceramic material.

3. The assembly as recited in claim 2, wherein the first gas turbine engine component is a turbine vane or a blade outer air seal.

4. The assembly as recited in claim 1, wherein the backing plate is dimensioned to span across an axial gap between the first and second gas turbine engine components relative to the assembly axis.

5. The assembly as recited in claim 1, wherein the first brush seal includes a first bristle pack welded to the first side plate and the backing plate and the second brush seal includes a second bristle pack welded to the second side plate and the backing plate to establish a unitary construction.

6. The assembly as recited in claim 1, wherein the backing plate includes a plurality of scallops circumferentially distributed about a periphery of the backing plate.

7. The assembly as recited in claim 1, wherein the second side plate includes a plate body and an annular flange extending circumferentially about the assembly axis, the annular flange dimensioned to engage an outer periphery of the second gas turbine engine component.

8. A seal assembly for a gas turbine engine comprising:
    a first side plate, a second side plate and a backing plate that extend circumferentially about an assembly axis;
    a first brush seal and a second brush seal;
    wherein the first and second brush seals are spaced apart by, and positioned on opposite sides of, the backing plate, the first brush seal is between the first side plate and the backing plate, the second brush seal is between the second side plate and the backing plate, the first brush seal is dimensioned to establish a first sealing relationship with a first gas turbine engine component, and the second brush seal is dimensioned to establish a second sealing relationship with a second gas turbine engine component; and
    wherein the first side plate includes a plurality of protrusions that interfit with recesses associated with the first gas turbine engine component to limit relative rotation.

9. A gas turbine engine comprising:
    a section including an array of blades rotatable about a longitudinal axis, an array of vanes adjacent to the array of blades, and an array of blade outer air seals arranged circumferentially about the array of blades relative to the longitudinal axis;
    a seal assembly dimensioned to span between the array of vanes and the array of blade outer air seals, the seal assembly comprising:

a first side plate, a second side plate and a backing plate that extend circumferentially about the longitudinal axis;

a first brush seal between the first side plate and the backing plate;

a second brush seal between the second side plate and the backing plate;

wherein the first and second brush seals are spaced apart from each other by the backing plate;

wherein the first brush seal is dimensioned to establish a first sealing relationship with the array of vanes, the second brush seal is dimensioned to establish a second sealing relationship with the array of blade outer air seals;

wherein each of the vanes includes an airfoil section extending from a platform section that bounds a gas path, the platform section is arranged to establish the first sealing relationship with the first brush seal, and the platform section comprises a ceramic material; and wherein each of the vanes includes a metallic spar member secured to a fairing, the fairing comprises a ceramic matrix composite material that establishes the airfoil section and the platform section, and the seal assembly is trapped between one or more of the spar members and one or more of the blade outer air seals.

10. The gas turbine engine as recited in claim 9, wherein the array of vanes and the array of blade outer air seals establish an axial gap relative to the longitudinal axis, the axial gap extending from a core flow path, and the seal assembly is dimensioned to span the axial gap.

11. The gas turbine engine as recited in claim 9, wherein the second side plate includes a plate body and an annular flange that extends circumferentially about the longitudinal axis, and the annular flange is dimensioned to engage an outer periphery of two or more of the blade outer air seals to secure the seal assembly to an engine static structure.

12. A gas turbine engine comprising:

a section including an array of blades rotatable about a longitudinal axis, an array of vanes adjacent to the array of blades, and an array of blade outer air seals arranged circumferentially about the array of blades relative to the longitudinal axis;

a seal assembly dimensioned to span between the array of vanes and the array of blade outer air seals, the seal assembly comprising:

a first side plate, a second side plate and a backing plate that extend circumferentially about the longitudinal axis;

a first brush seal between the first side plate and the backing plate;

a second brush seal between the second side plate and the backing plate;

wherein the first and second brush seals are spaced apart from each other by the backing plate;

wherein the first brush seal is dimensioned to establish a first sealing relationship with the array of vanes, the second brush seal is dimensioned to establish a second sealing relationship with the array of blade outer air seals; and wherein the first brush seal is dimensioned to extend in a first axial direction from the backing plate relative to the longitudinal axis such that the first sealing relationship is established along an axial face associated with the array of vanes, and wherein the second brush seal is dimensioned to extend in a second axial direction from the backing plate relative to the longitudinal axis such that the second sealing relationship is established along an axial face associated with the array of blade outer air seals.

* * * * *